United States Patent
Uchihara (10) Patent No.: US 9,282,302 B2
(45) Date of Patent: Mar. 8, 2016

(54) STRIPE NOISE CORRECTION METHOD OF CAPTURED IMAGE, PHOTOGRAPHING APPARATUS AND ELECTRONIC ENDOSCOPIC APPARATUS

(71) Applicant: FUJIFILM CORPORATION, Tokyo (JP)

(72) Inventor: Masanobu Uchihara, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 337 days.

(21) Appl. No.: 13/853,696

(22) Filed: Mar. 29, 2013

(65) Prior Publication Data
US 2013/0258082 A1 Oct. 3, 2013

(30) Foreign Application Priority Data
Mar. 30, 2012 (JP) ................................. 2012-080680

(51) Int. Cl.
| | | |
|---|---|---|
| H04N 5/335 | (2011.01) | |
| H04N 9/64 | (2006.01) | |
| H04N 5/365 | (2011.01) | |
| G02F 1/1347 | (2006.01) | |

(52) U.S. Cl.
CPC .............. *H04N 9/646* (2013.01); *H04N 5/335* (2013.01); *H04N 5/3658* (2013.01); *G02F 1/13473* (2013.01)

(58) Field of Classification Search
CPC ................................... H04N 5/3658
USPC ................................................ 348/68, 242
See application file for complete search history.

(56) References Cited

U.S. PATENT DOCUMENTS

| 4,513,312 A * | 4/1985 | Takemura .................... 348/275 |
| 4,642,677 A * | 2/1987 | Takanashi et al. ............ 348/336 |
| 6,985,170 B1 * | 1/2006 | Tsuyuki .......................... 348/65 |
| 2004/0057616 A1* | 3/2004 | Kondo et al. ................. 382/167 |
| 2005/0001916 A1* | 1/2005 | Takita ........................... 348/308 |
| 2005/0140795 A1 | 6/2005 | Hisamatsu et al. |
| 2006/0092288 A1* | 5/2006 | Hara et al. ................. 348/222.1 |
| 2006/0124833 A1* | 6/2006 | Toda ......................... 250/214 R |
| 2009/0103829 A1 | 4/2009 | Takahashi et al. |
| 2009/0122166 A1* | 5/2009 | Suzuki .......................... 348/242 |

FOREIGN PATENT DOCUMENTS

| JP | 2005-167918 A | 6/2005 |
| JP | 4396757 B2 | 1/2010 |

* cited by examiner

*Primary Examiner* — Richard Torrente
*Assistant Examiner* — Marnie Matt
(74) *Attorney, Agent, or Firm* — Birch, Stewart, Kolasch & Birch, LLP (57) ABSTRACT

A stripe noise correction method of a captured image includes: storing a value calculated by rounding off a portion below the decimal point of a stripe noise value into a memory as correction data of an integer part that corrects a stripe noise for each color; and storing the magnitude of a quantization error calculated by rounding off for each color and for each pixel column or each pixel row into the memory as correction data of a fractional part; and correcting captured image signals of the image captured by a image sensor with the correction data of the integer part and the fractional part read from the memory.

6 Claims, 11 Drawing Sheets

| CORRECTION DATA OF FRACTIONAL PART | CORRECTION METHOD |
|---|---|
| 0.5 | SUBTRACT 1 FROM ONE PIXEL EVERY TWO PIXELS AMONG COLUMN |
| 0.4 | SUBTRACT 1 FROM TWO PIXELS EVERY FIVE PIXELS AMONG COLUMN |
| 0.3 | SUBTRACT 1 FROM THREE PIXELS EVERY TEN PIXELS AMONG COLUMN |
| 0.2 | SUBTRACT 1 FROM ONE PIXEL EVERY FIVE PIXELS AMONG COLUMN |
| 0.1 | SUBTRACT 1 FROM ONE PIXEL EVERY TEN PIXELS AMONG COLUMN |
| 0 | NOT CORRECT FOR FRACTIONAL PART |
| -0.1 | ADD 1 TO ONE PIXEL EVERY TEN PIXELS AMONG COLUMN |
| -0.2 | ADD 1 TO ONE PIXEL EVERY FIVE PIXELS AMONG COLUMN |
| -0.3 | ADD 1 TO THREE PIXELS EVERY TEN PIXELS AMONG COLUMN |
| -0.4 | ADD 1 TO TWO PIXELS EVERY FIVE PIXELS AMONG COLUMN |
| -0.5 | ADD 1 TO ONE PIXEL EVERY TWO PIXELS AMONG COLUMN |

STRIPE NOISE CORRECTION METHOD OF CAPTURED IMAGE, PHOTOGRAPHING APPARATUS AND ELECTRONIC ENDOSCOPIC APPARATUS

CROSS-REFERENCE TO RELATED APPLICATIONS

This application is based on and claims priority under 35 USC 119 from Japanese Patent Application No. 2012-080680 filed on Mar. 30, 2012; the entire content of which is incorporated herein by reference.

BACKGROUND OF THE INVENTION

1. Technical Field

The present invention relates to a stripe noise correction method of a captured image, a photographing apparatus and an electronic endoscopic apparatus.

2. Related Art

A solid-state imaging device (an image sensor) for photographing a color image includes a plurality of pixels (photodiodes) arranged on a semiconductor substrate in a two-dimensional array type. And, in the solid-state imaging device, a color filter is stacked on each of the pixels, and, for example, an amplifier or an analog/digital (A/D) convertor is provided in each pixel column.

It is difficult to manufacture the amplifiers or the like, each of which is installed in the corresponding pixel column, to have the same performance, and a fluctuation in manufacture may occur. For this reason, a vertical stripe noise caused by the fluctuation in manufacture of the amplifiers or the like overlaps with a captured image of a subject. Since the vertical stripe noise deteriorates the image quality when the vertical stripe noise exists in a captured image, a correction processing is performed to reduce the vertical stripe noise. Although this example is described with the vertical stripe noise, a transverse stripe noise occurs when an amplifier or the like is provided in each pixel row. Although descriptions below are made with respect to the vertical stripe noise, the descriptions will be equally applied to the transverse stripe noise.

Since a vertical stripe noise is a fixed pattern noise, an inherent vertical stripe noise component of a solid-state imaging device may be calculated in advance. When a subject is captured, the vertical stripe noise correction may be performed by subtracting the vertical stripe noise component from a real detection signal of each of the pixels. However, since the vertical stripe noise correction is performed in a digital signal processing, a portion below the decimal point of the vertical stripe noise component cannot be removed. Accordingly, a quantization error occurs. That is, the quantization error remains as a narrow vertical stripe noise.

As disclosed in Patent Document 1 (JP-B-4396757) and Patent Document 2 (JP-A-2005-167918) in the related art, the vertical stripe noise correction includes a processing performed in which an artificial random noise is added such that an error equal to or less than a quantization accuracy (vertical stripe noise) is made less noticeable. In Patent Document 2, the ratio of adding the random noise is controlled on the basis of the magnitude of the quantization error.

SUMMARY OF THE INVENTION

The vertical stripe correction method discussed above has no problem when the method is applied to an image sensor mounted in a compact or single-lens reflex (SLR) digital camera. This is because the photographing is performed using a sunlight or a bright illuminating light as illuminating light.

Under bright illuminating light, the absolute value of a signal amount S detected by each pixel is large. As a result, even when small random noise is overlapped, the noise component is less noticeable in the captured image.

On the other hand, there is a problem in the vertical stripe noise correction of an image sensor used under a special environment. For example, the image sensor of an electronic endoscopic apparatus is inserted into a body cavity, which is a dark place, and captures a subject image under insufficient illuminating light, which is illuminated to an affected part from a front end of an endoscopic scope via a slender light guide.

The insufficient illuminating light means that the absolute value of the signal amount S detected by each of the pixels is small, and the noise amount N is relatively increased. For this reason, the S/N (signal-to-noise ratio) is deteriorated as compared to an image sensor capable of using sunlight as illuminating light, and thus, the vertical stripe noise becomes noticeable.

Specifically, an image captured by an electronic endoscopic apparatus is displayed on a monitor in a moving image format. Accordingly, when the vertical stripe noise overlaps on the same portion for every frame by the quantization error, the vertical stripe noise will more noticeable on the monitor image. With respect to the vertical stripe noise, even in white light observation other than the special light observation (narrow-band light observation), in which the wavelength band of the illuminating light is narrowed by weakening the illuminating light, fine vertical stripe noise becomes noticeable by performing an emphasizing processing to the observation image.

The related art merely makes vertical stripe noise based on a quantization error noticeable by overlapping an artificially produced random noise, and does not remove a vertical stripe noise component caused by the quantization error. Further, the related art does not consider a method to remove vertical stripe noise with high precision from a single-plate image sensor for capturing a color image.

An object of the present invention is to provide a stripe noise correction method of a captured image, a photographing apparatus, and an electronic endoscopic apparatus in which the stripe noise is capable of being removed with high precision from the image captured by a single-plate image sensor for capturing a color image even when the image sensor is used under a special environment.

According to an aspect of the invention, a stripe noise correction method of a captured image includes: capturing, by a single-plate type image sensor for color image capturing that includes a plurality of pixels arranged in a square lattice array and a plurality of color filters with different colors which are respectively stacked on each of the pixels in a mosaic type, a plurality of images each of which has the same color with one of the colors of the color filters; calculating an average image for color images for the plurality of images and dividing the captured image signals of the average image into individual colors of the color filters; calculating, for each color, the stripe noise value for each pixel column or each pixel row by subtracting the average value of the captured image signals in the entire area where the pixels of the image sensor are arranged from the average value of the captured image signals of each pixel column or each pixel row of the image sensor; storing a value calculated by rounding off a portion below the decimal point of the stripe noise value into a memory as correction data of an integer part that corrects the stripe noise for each color; and storing the magnitude of a quantization error calculated by rounding off for each color and for each pixel column or each pixel row into the memory as correction data of a fractional part; and correcting the captured image signals of the image captured by the image sensor with the correction data of the integer part and the fractional part read from the memory.

According to another aspect of the invention, a photographing apparatus includes: the aforementioned image sensor; the memory; and an image processing unit that performs the stripe noise correction.

According to another aspect of the invention, an electronic endoscopic apparatus includes: an endoscopic scope that is inserted into a body cavity; the aforementioned image sensor that is accommodated in the front end part of the endoscopic scope; an illuminating unit that illuminates illuminating light from the front end part of the endoscopic scope; the memory; and an image processing unit that performs the stripe noise correction.

With any one of the configurations discussed above, a stripe noise caused by a fluctuation in manufacturing a solid-state imaging device may be removed with high precision, thereby obtaining a captured image with high quality.

DETAILED DESCRIPTION OF EMBODIMENTS OF THE INVENTION

Hereinafter, an exemplary embodiment of the present invention will be described with reference to the accompanying drawings.

Figure 1:
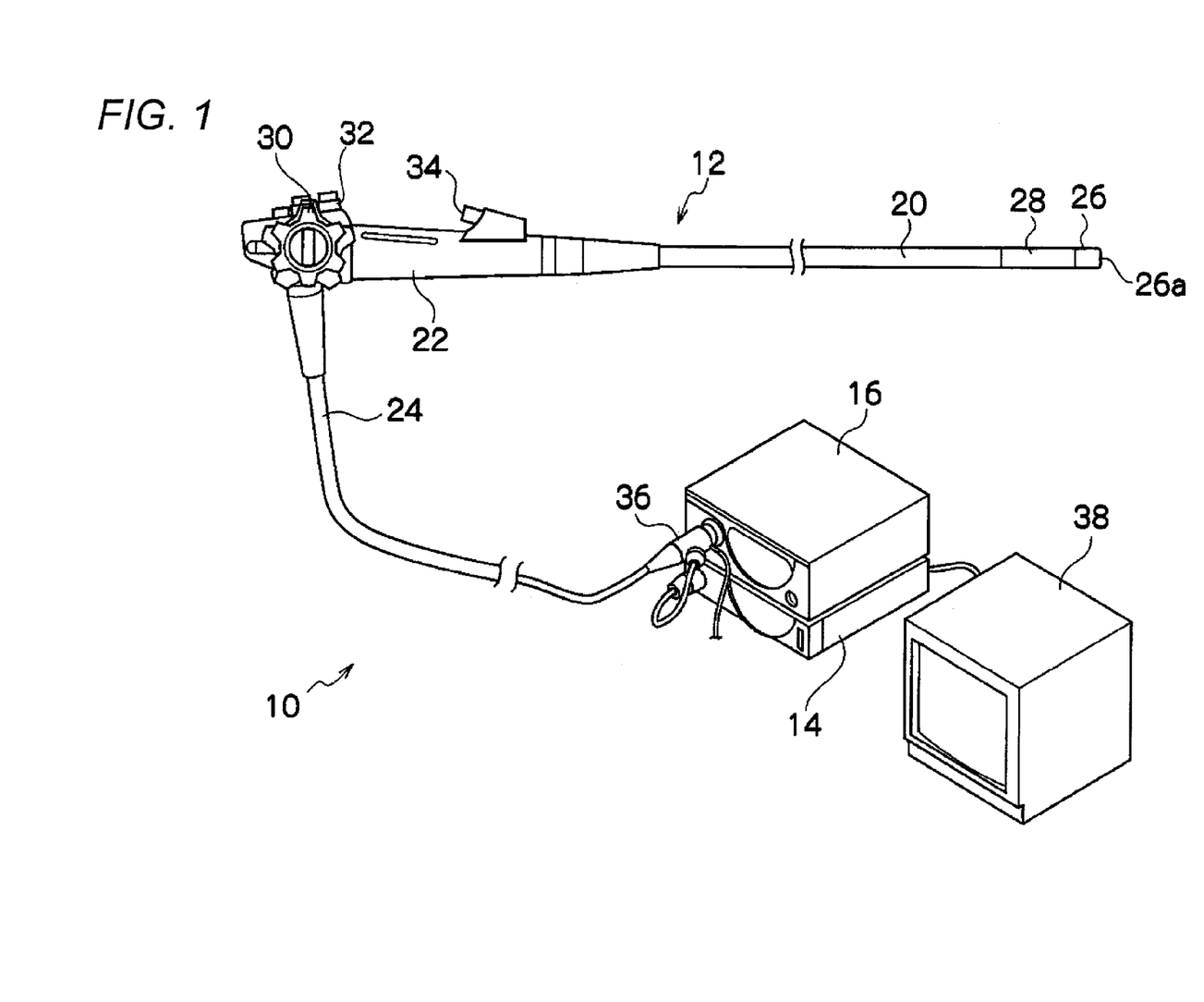
FIG. 1 is a system configuration view of an entire electronic endoscopic apparatus according to an exemplary embodiment of the present invention.

FIG. 1 is a system configuration view of an entire electronic endoscopic apparatus according to an exemplary embodiment of the present invention. The electronic endoscopic apparatus (endoscope system) 10 of the present exemplary embodiment includes an endoscopic scope 12, and a processor device 14 and a light source device 16 that constitute a main body apparatus. The endoscopic scope 12 includes a flexible inserting unit 20 that is inserted into a body cavity of a patient (a subject), a manipulating unit 22 installed to be connected with a base end of the inserting unit 20, and a universal cord 24 that is connected with the processor device 14 and the light source device 16.

A front-end part 26 is continuously formed in the front-end of the inserting unit 20, an imaging chip 54 (an imaging device see FIG. 3) for photographing the inside of the body cavity is accommodated in the front-end part 26. A curved unit 28 formed by connecting a plurality of curved pieces is installed in the rear of the front-end part 26. The curved unit 28 is curvedly operated in the up-down and left-right directions by pushing/pulling a wire provided by being inserted within the inserting unit 20 when an angle knob 30 installed in the manipulating unit 22 is manipulated. Therefore, the front-end part 26 faces a desired direction within the body cavity.

A connector 36 is installed in the base end of the universal cord 24. The connector 36 is a complex type, and is connected to the light source device 16 as well as the processor device 14.

The processor device 14 supplies power to the endoscopic scope 12 via a cable 68 (see FIG. 3) inserted through the universal cord 24 to control the driving of the imaging chip 54, and at the same time, the processor device 14 receives an imaging signal transmitted from the imaging chip 54 via the cable 68, and performs various signal processings on the received imaging signal to convert into image data.

The image data converted in the processor device 14 is displayed in a monitor 38 as an endoscopic photographing image (an observation image). The monitor 38 is connected to the processor device 14 with a cable. The processor device 14 is also electrically connected to the light source device 16 via the connector 36, and generally controls the operations of the electronic endoscopic apparatus 10 including the light source device 16.

Figure 2:
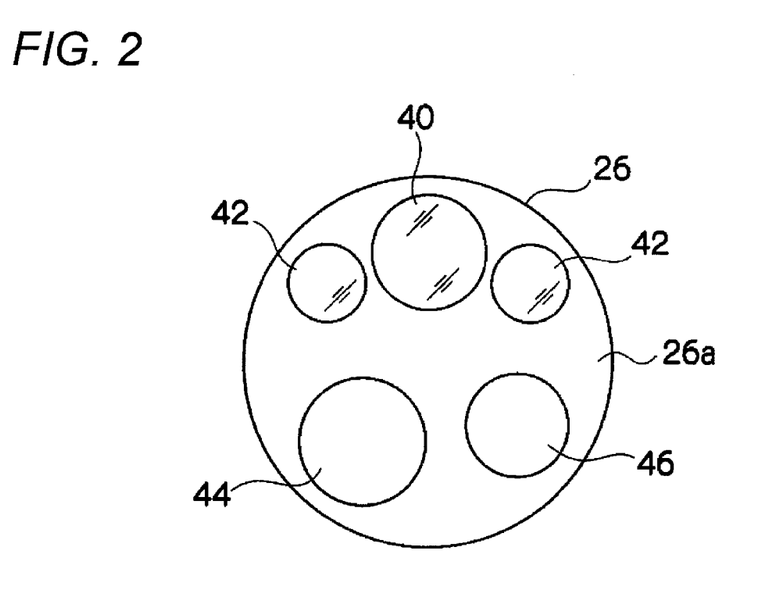
FIG. 2 is a front view a front end surface of a front end part of the electronic endoscope illustrated in FIG. 1.

FIG. 2 is a front view illustrating a front-end surface 26a of the front-end part 26 of the endoscopic scope 12. As illustrated in FIG. 2, an observation window 40, illuminating windows 42, a forceps outlet 44, an air/water transferring nozzle 46 are formed in the front-end surface 26a of the front-end part 26.

The observation window 40 is arranged at a center part of the front-end surface 26a and a position offset from the center of the front-end surface 26a. Two illuminating windows 42 are arranged in symmetric locations with respect to the observation window 40, and illuminate the light from the light source device 16 to the portion to be observed within the body cavity.

The forceps outlet 44 is connected to a forceps channel 70 (See, FIG. 3) arranged within the inserting unit 20, and is communicated with a forceps inlet 34 (see FIG. 1) installed in the manipulating unit 22. Various treatment tools, of which front-ends are provided with, for example, an injection needle or a high frequency mess, are inserted through the forceps inlet 34, and the front-ends of the various treatment tools come out from the forceps outlet 44 and into the body cavity.

The air/water transferring nozzle 46 sprays cleaning water or air supplied from an air/water transferring device accommodated in the light source device 16 toward the inside of the body cavity or the observation window 40 according to the manipulation of an air/water transferring button 32 (see FIG. 1) installed in the manipulating unit 22.

Figure 3:
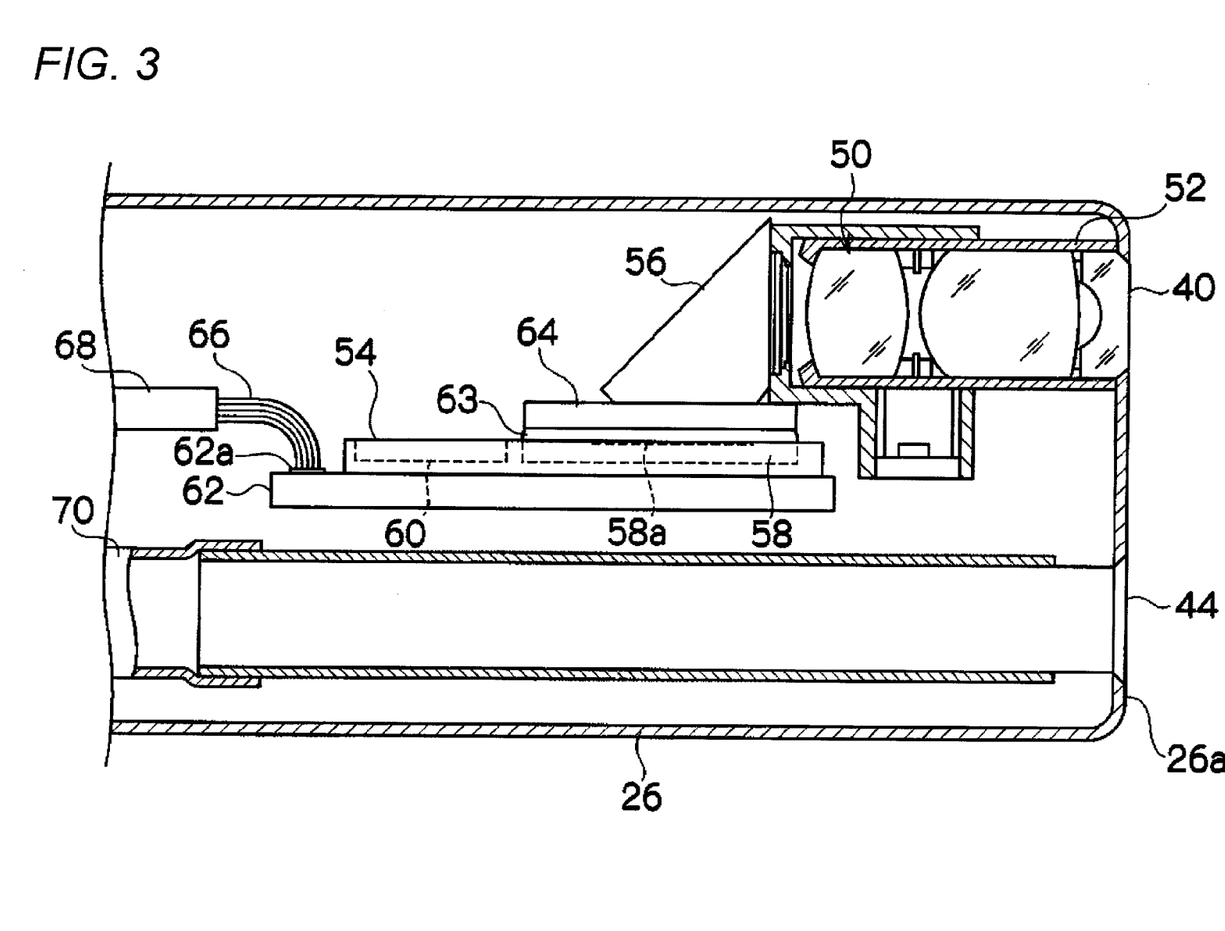
FIG. 3 is a longitudinal cross-sectional view of the front end part of the electronic endoscope illustrated in FIG. 1.

FIG. 3 is a view illustrating the longitudinal cross-section of the front-end part 26 of the endoscopic scope 12. As illustrated in FIG. 3, a barrel 52 is disposed inside the observation window 40. The barrel 52 holds an object optical system 50 to receive an image light of a portion to be observed within the body cavity. The barrel 52 is attached such that the optic axis of the object optical system 50 is parallel to the center axis of the inserting unit 20. A prism 56 is connected to the rear end of the barrel 52. The prism 56 guides a light such that the image light of the portion to be observed is bent through the object optical system 50 at right angles to be directed to the imaging chip 54.

The imaging chip 54 is a monolithic semiconductor (a sensor chip) which is integrally formed with a solid-state imaging device 58 and a peripheral circuit 60 that performs the driving and the input/output of the signals of the solid-state imaging device 58. The imaging chip 54 is mounted on a support substrate 62.

The imaging surface (light-receiving surface) 58a of the solid-state imaging device 58 is arranged to face an exit surface of the prism 56. A rectangular plate shaped cover glass 64 is attached on the imaging surface 58a via a rectangular frame shaped spacer 63. The imaging chip 54, the spacer 63 and the cover glass 64 are assembled using an adhesive, and as a result, the imaging surface 58a is protected from the infiltration of dust or the like.

A plurality of input/output terminals 62a are installed side by side in the width direction in the rear end of the support substrate 62 installed to extend toward the rear end of the inserting unit 20. The input/output terminals 62a are connected to signal lines 66 to exchange various signals with the processor device 14 through the universal cord 24, and are electrically connected to the peripheral circuit 60 within the imaging chip 54 through, for example, wirings or bonding pads (not illustrated) formed in the support substrate 62.

The signal lines 66 are integrally inserted within a flexible tubular cable 68. The cable 68 is inserted into the inside of each of the inserting unit 20, the manipulating unit 22 and the universal cord 24, and is connected to the connector 36.

Although not illustrated in FIGS. 2 and 3, an illuminating unit is installed in the inner side of the illuminating windows 42. The exit end 120a of a light guide 120 (see FIG. 4) that guides the illuminating lights from the light source device 16 is disposed in the illuminating unit, and the exit end 120a is installed to face the illuminating windows 42. The light guide 120 is inserted into the inside of each of the inserting unit 20, the manipulating unit 22 and the universal cord 24, like the cable 68, and is connected to the connector 36 at the incident end thereof.

Figure 4:
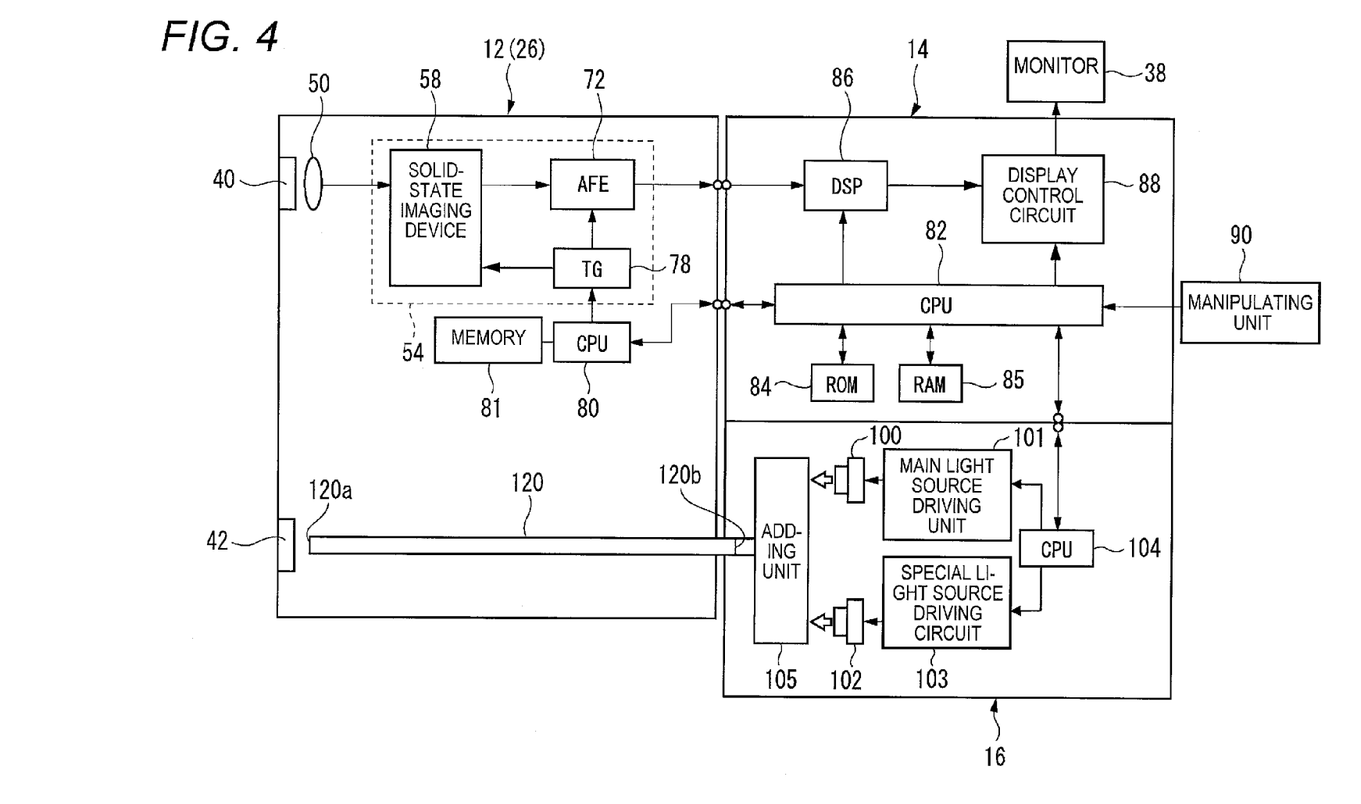
FIG. 4 is a block configuration diagram of a control system of the electronic endoscopic apparatus illustrated in FIG. 1.

FIG. 4 is a block diagram illustrating a control system of the electronic endoscopic apparatus 10. As illustrated in FIG. 4, the imaging device 58, an analog signal processing circuit (an analog front end; AFE) 72, a timing generator (TG) 78, and a CPU 80 are installed in the front end part 26 of the endoscopic scope 12. The AFE 72 or the TG 78 corresponds to the peripheral circuit 60 in FIG. 3. The CPU 80 is connected to a memory 81 such as, for example, an EEPROM. The vertical stripe correction data of the solid-state imaging device 58 is preserved in the memory 81.

The TG 78 generates a driving pulse (for example, a vertical/horizontal scan pulse and a reset pulse) of the solid-state imaging device 58 and a synchronized pulse for the AFE 72, based on the control of the CPU 80. The solid-state imaging device 58 is driven according to the driving pulse inputted from the TG 78, and photoelectrically converts the optical shape imaged on the imaging surface 58a through the object optical system 50 to output as an imaging signal.

A plurality of pixels are arranged in a matrix type in the imaging surface 58a of the solid-state imaging device 58, and a photo sensor (photoelectric conversion device) is installed in each of the pixels. The light incident to the imaging surface 58a of the solid-state imaging device 58 is accumulated in the photo sensor of each of the pixels as electrical charges. The signal electrical charges accumulated in the photo sensor of each of the pixels are sequentially read out as pixel signals and output in a predetermined frame rate by vertical and horizontal scanning using a vertical scan circuit and a horizontal scan circuit (both not illustrated).

The solid-state imaging device 58 is a single-plate color imaging type solid-state imaging device including color filters (for example, primary color filters in a Bayer array) formed by a plurality of color segments.

The configuration of the signal read-out circuit that reads out the accumulated charges of each of the photo sensors of the solid-state imaging device 58 as an imaging signal is known, and a general configuration such as, for example, a three transistor configuration or a four transistor configuration may be applied thereto. The descriptions thereof will be omitted herein.

The AFE 72 is constituted by a correlated double sampling (CDS) circuit, an automatic gain circuit (AGC), and an A/D converter. The CDS circuit performs a correlated double sampling processing with respect to an imaging signal outputted from the solid-state imaging device 58 to remove an amp noise and a reset noise generated from the solid-state imaging device 58. The AFE 72 is provided for each of the columns of the solid-state imaging device 58.

The AGC amplifies the imaging signal of which the noise is removed by the CDS circuit to a gain (amplifying rate) designated from the CPU 80. The A/D converter converts the imaging signal amplified by the AGC into a digital signal in a predetermined bit number, and outputs the converted signal. The imaging signal (digital imaging signal) digitalized and output from the AFE 72 is input to the processor device 14 via the signal lines 66.

The processor device 14 is configured to include the CPU 82, a ROM 84, a RAM 85, an image processing circuit (DSP) 86, and a display control circuit 88.

The CPU 82 controls each part of the processor device 14, and at the same time, generally controls the entire electronic endoscopic apparatus 10. Various programs to control the operations of the processor device 14 or control data are stored in advance in the ROM 84. For example, programs executed by the CPU 82 or data are temporarily stored in the RAM 85.

The DSP 86 performs, for example, a vertical stripe noise correction processing, a color interpolation, a color separation, a color balance adjustment, a gamma adjustment, and an image enhancement processing to generate an image data with respect to the imaging signal imputed from the AFE 72 based on the control of the CPU 82.

The image data output from the DSP 86 is input to the display control circuit 88, and the display control circuit 88 converts the image data input from the DSP 86 into a signal format corresponding to the monitor 38 to be displayed to the screen of the monitor 38.

The manipulating unit 90 of the processor device 14 is provided with a mode conversion button to select or convert the operation modes of the solid-state imaging device 58, or various buttons to receive other instruction inputs from user.

The light source device 16 is configured to include a main light source 100, a main light source driving circuit 101, a special light source 102, a special light source driving circuit 103, a CPU 104, and a multiplexer unit 105. The CPU 104 communicates with the CPU 82 of the processor device 14 to control the main light source driving circuit 101 and the special light source driving circuit 103.

The main light source 100 emits a white light, and the special light source 102 emits a special light of a narrow band of which the center is, for example, 420 nm. The white light or the special light exits to the incident end 120*b* of the light guide 120 through the multiplexer unit 105.

When the inside of a body cavity is observed with the electronic endoscopic apparatus 10 as described above, the endoscopic scope 12, the processor device 14, the light source device 16, and the monitor 38 are turned ON, the inserting unit 20 of the endoscopic scope 12 is inserted into the body cavity. A moving image in the inside of the body cavity captured by the solid-state imaging device 58 is observed through the monitor 38 while illuminating the inside of the body cavity using the illuminating light from the light source device 16.

When an image to be displayed in the monitor 38 is generated, the DSP 86 receives captured image signals (an RAW signals) outputted from the solid-state imaging device 58 and performs vertical stripe correction for each of the colors. Then, the DSP 86 performs known various image processings such as, for example, a synchronization processing (de-mosaic processing), a gamma correction processing and an RGB/YC conversion processing to the captured image signals of each pixel position after the vertical stripe correction, thereby generating an image to be displayed on the monitor 38.

In the present exemplary embodiment, the vertical stripe correction data used when performing the vertical stripe correction is determined in the following manner, and is stored in the memory 81.

Figure 5:
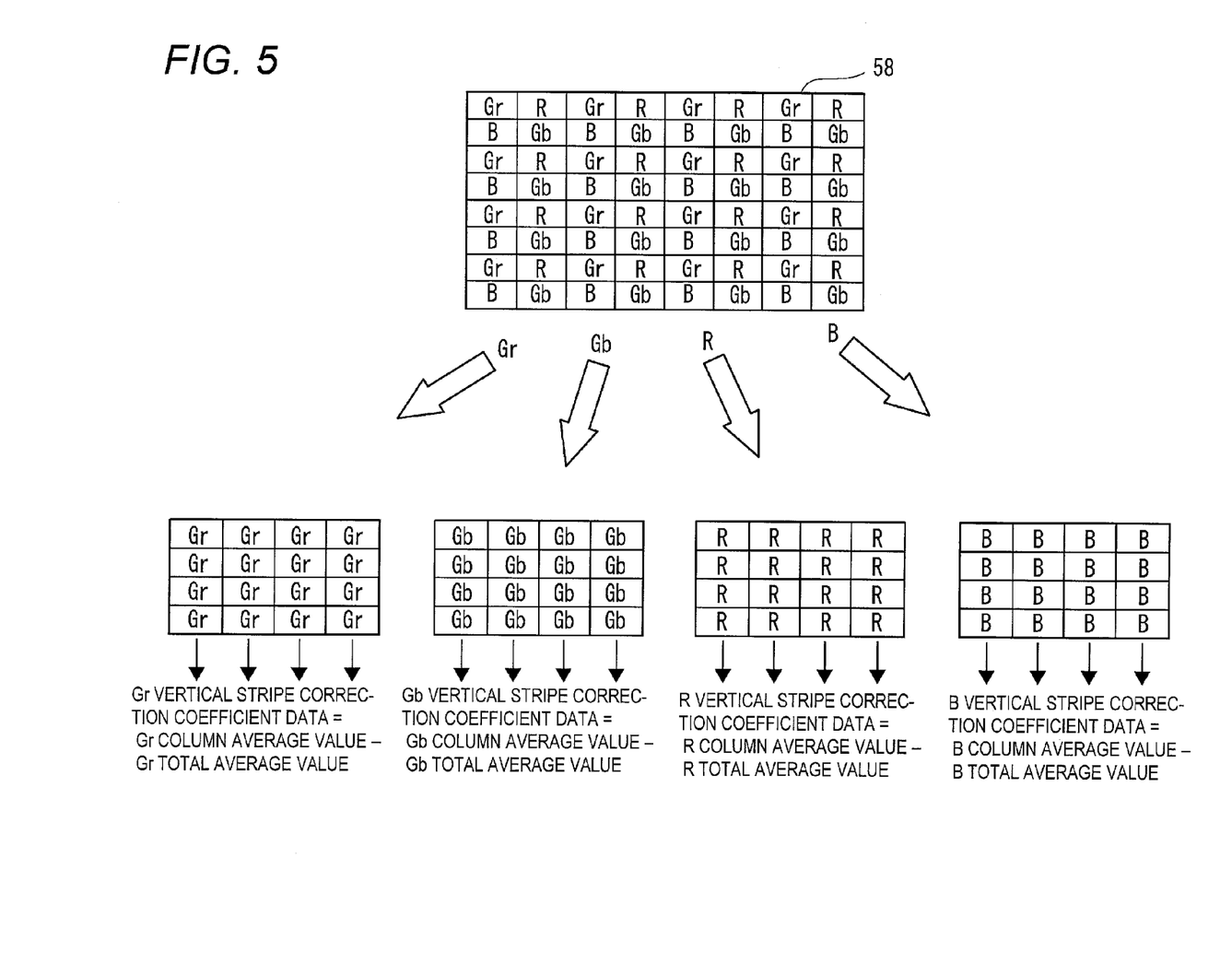
FIG. 5 is an explanatory diagram for calculating vertical stripe noise for each of four colors (Gr, Gb, R, B) with a solid-state imaging device of which the color filter arrangement is a Bayer array.
Figure 6:
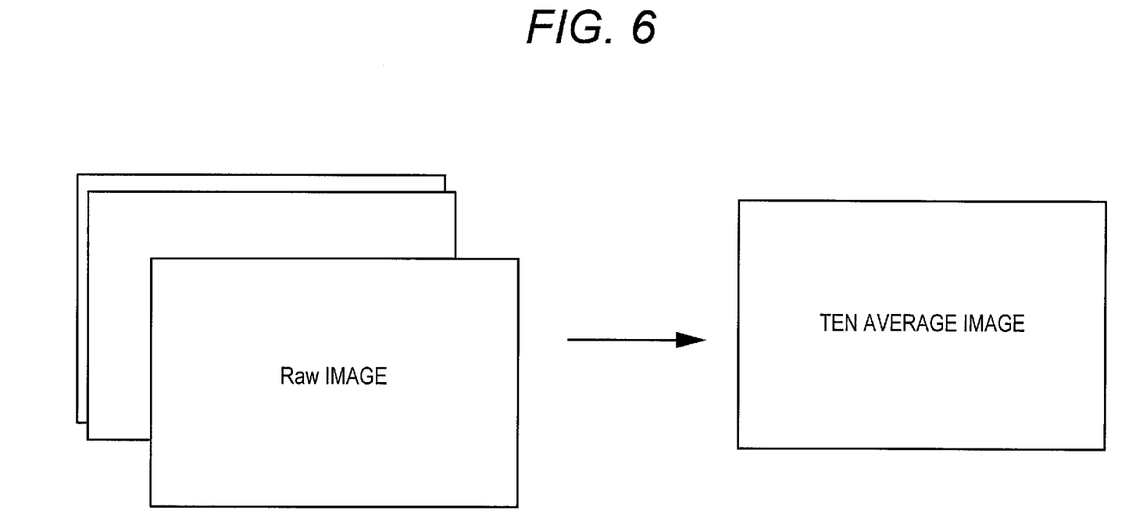
FIG. 6 is an explanatory diagram of a color image when a profile of a vertical stripe noise is calculated.
Figure 7:
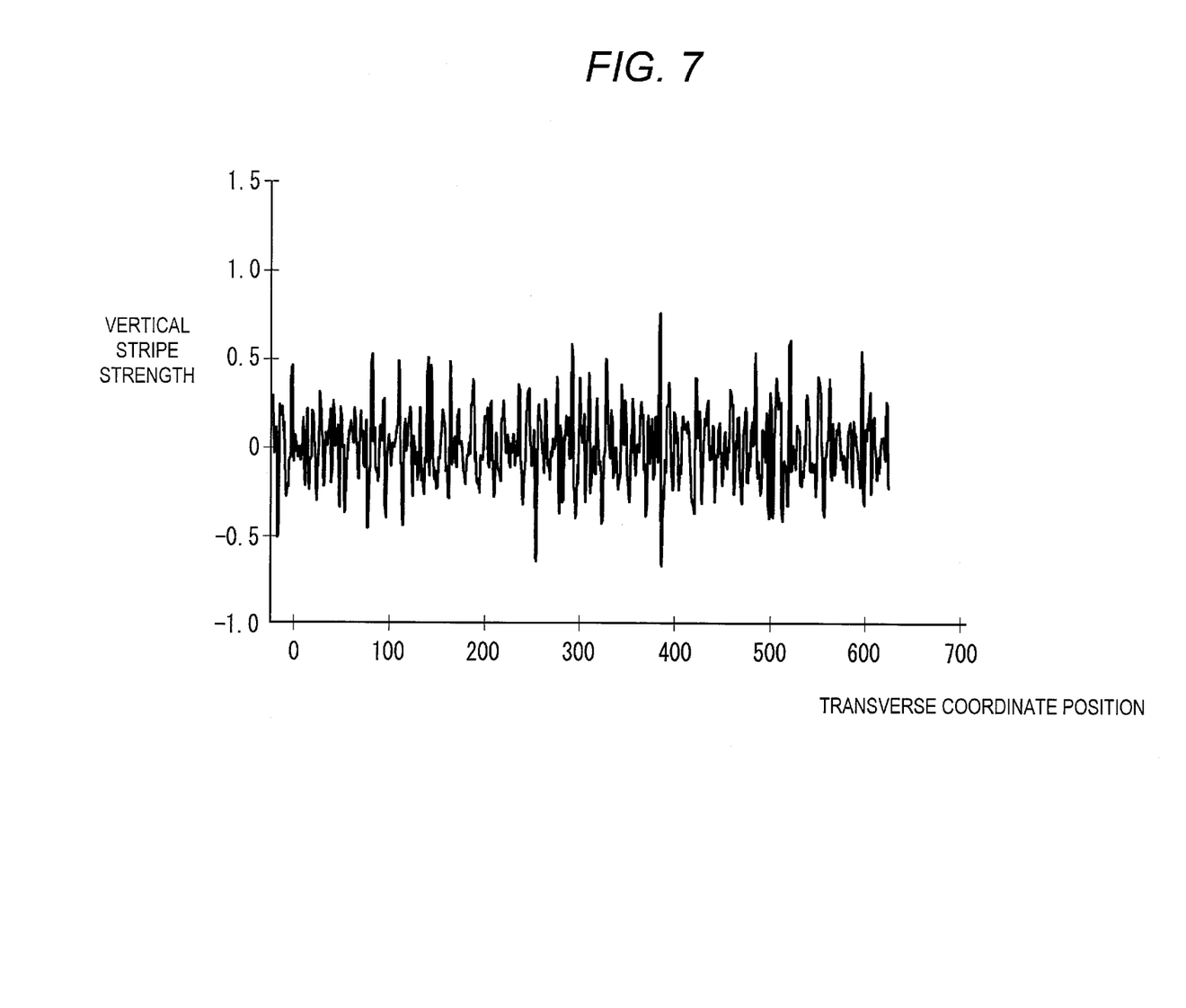
FIG. 7 is a characteristic diagram of a low-frequency noise removed vertical stripe noise.

The upper part of FIG. 5 is a schematic view of a surface of the solid-state imaging device 58. Three primary color filters of R (red), G (green), and B (blue) are arranged in a Bayer array in the solid-state imaging device 58 in which a plurality of pixels are arranged in a square lattice array. In the present exemplary embodiment, a green (G) filter adjacent to a pixel equipped with an R filter in a transverse direction (row direction) is set to a "Gr", and a green (G) filter adjacent to a pixel equipped with a B filter in the transverse direction is set to a "Gb". The Gr and Gb are the same in color, but are treated as having different colors when the vertical stripe correction data are calculated.

About 10 single color images of red (R), green (G), and blue (B) are captured using the solid-state imaging device 58, and a detection value of each of the pixels of an average image thereof is calculated, as illustrated in FIG. 5.

Next, as illustrated in FIG. 5, each of the images is divided into color surfaces of four colors of R, Gr, Gb, and B, and an average value (total average value) of the pixel detection values of the entire area for each of the colors (R, Gr, Gb, B) is calculated. Separately, an average value (column average value) of the detection values of the individual pixels aligned in the same vertical direction (column direction) is calculated for each of the colors (R, Gr, Gb, B).

Then, "a column average value–a total average value" is calculated for each of the colors (R, Gr, Gb, B) and for each of the pixel columns. A data group of the "column average values–total average values" for each of the colors and for each of the pixel columns forms a profile of a vertical stripe strength.

Figure 8:
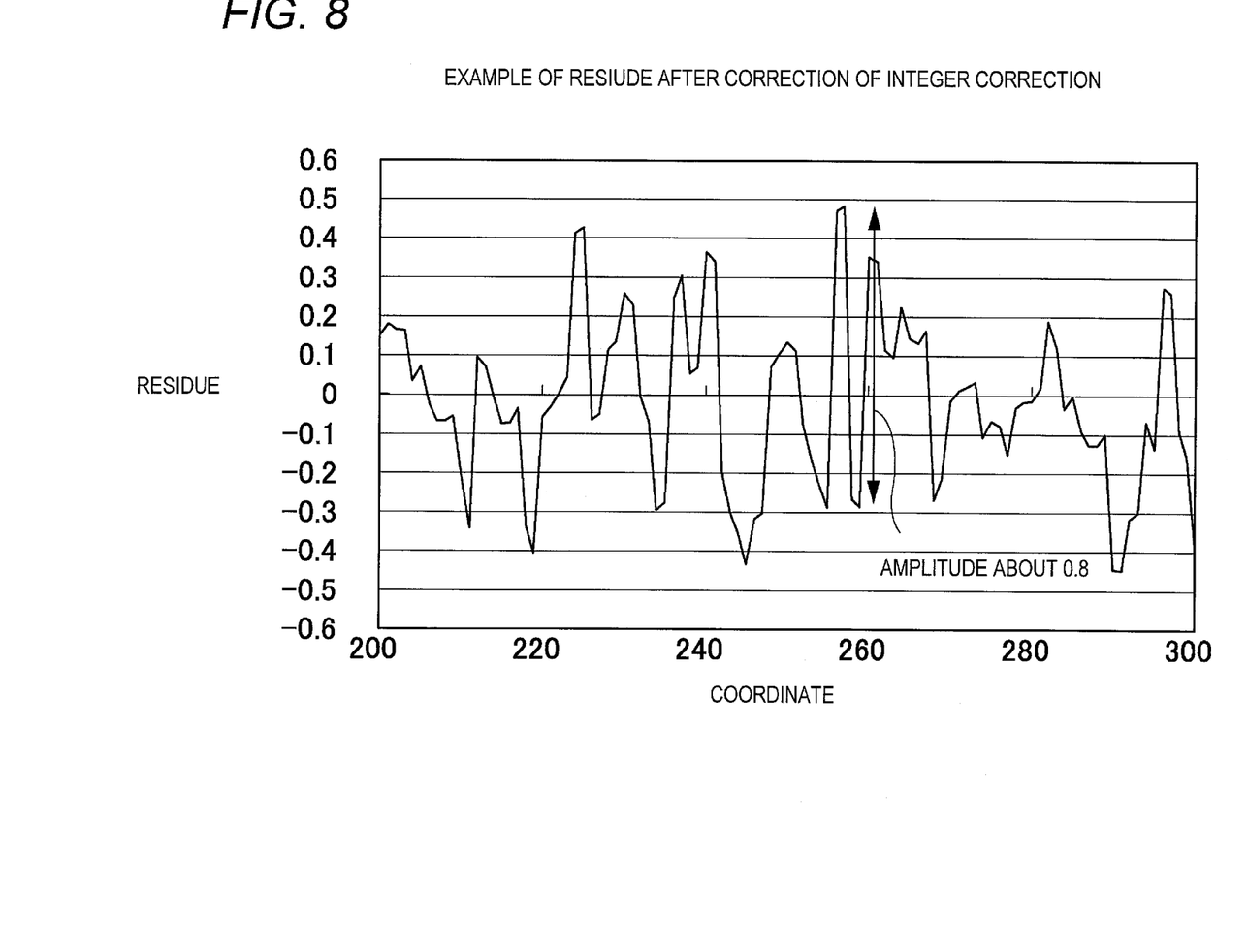
FIG. 8 is a characteristic diagram illustrating residue data after corrected with vertical stripe correction data of an integer part.

It is not only the values of the vertical stripe noise that are included in the profile of the vertical stripe strength. FIG. 8 is a graph illustrating a profile of the vertical stripe strength of, for example, Gr color. The transverse axis indicates a transverse position (column coordinate position) of the solid-state imaging device 58, and the vertical axis indicates the value of the vertical stripe strength.

The removal of the vertical stripe noise may be performed, for example, as below. In the Bayer array illustrated in the upper part of FIG. 5, columns where Gr colors and B colors are aligned and columns where Gb colors and R colors are aligned are alternately arranged. A value of a Gr color which is calculated by subtracting the vertical stripe correction data for the Gr color at the pixel column position from a real Gr pixel detection value detected from the pixel column of Gr colors and B colors, is set to a Gr pixel detection value after the vertical stripe correction. The same calculation will be performed with respect to the B colors, Gb colors, and R colors.

Even if such vertical stripe noise correction is performed, a vertical stripe may appear in sight in the observation image in an observation performed under a special environment, for example, such as an electronic endoscope. This is believed due to an effect of the quantization error by rounding off below the decimal point.

Hereinafter, the correction to remove the effect of the quantization error will be described. That is, how to perform the correction of the fractional part equal to or less than ±0.5 by rounding off below the decimal point will be described.

FIG. 8 is a graph illustrating a vertical strip strength distribution after the vertical stripe correction of the captured image using the vertical stripe correction data of an integer. That is, it is a graph illustrating residue data after the correction by an integer part. The transverse axis is the coordinate of a pixel column position, and the vertical axis is the residue strength of a vertical stripe.

Since the portion below the decimal point is rounded off, the residue of a vertical stripe is within the range of −0.5 to +0.5. However, the amplitude of the residue strength of the vertical stripe may theoretically become "1" in its maximum. For this reason, the residue equal to or less than ±0.5 needs to be corrected to be smaller in order to perform the vertical stripe correction with higher precision.

Figure 9:
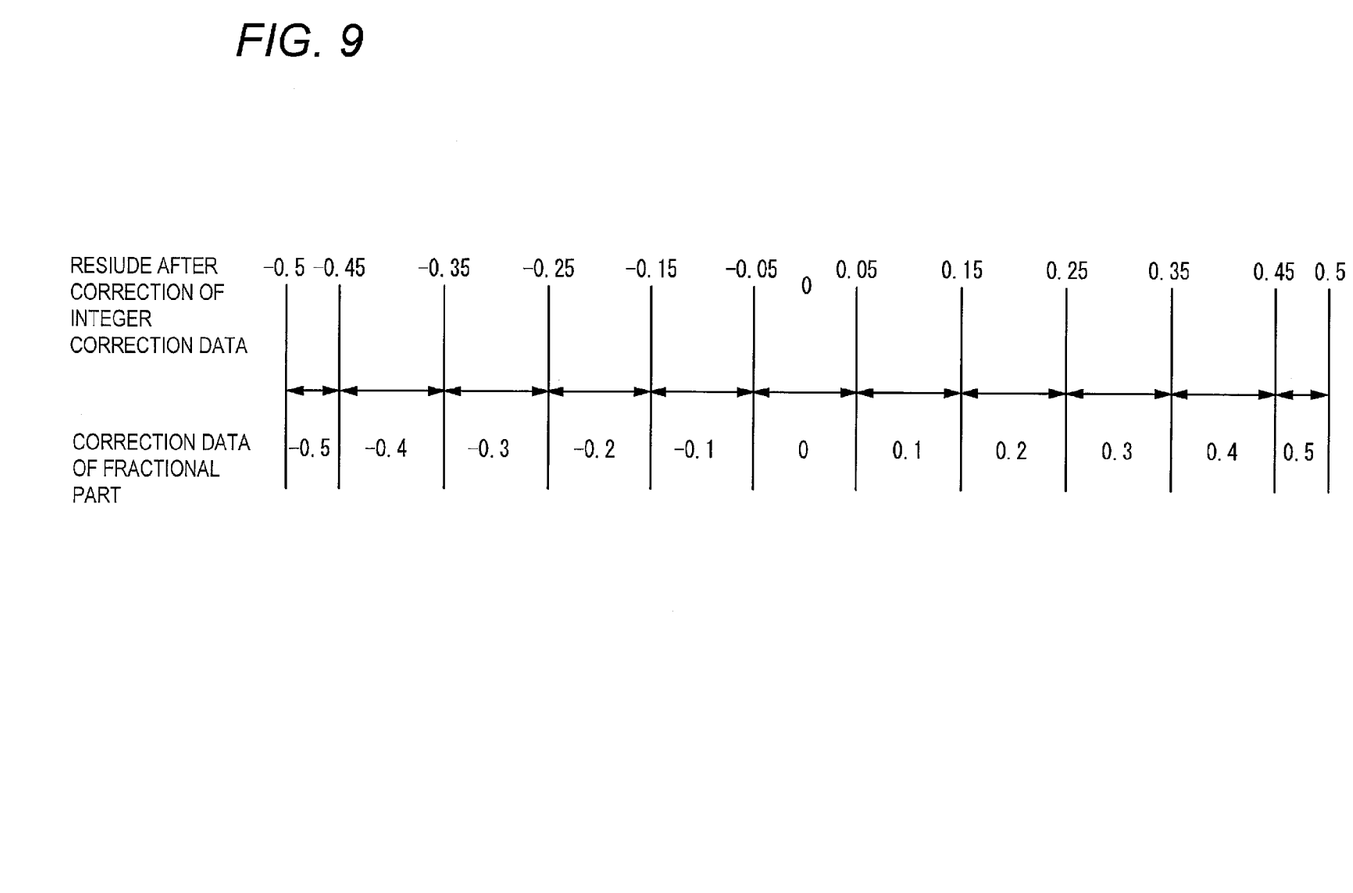
FIG. 9 is an explanatory diagram of vertical stripe correction data of a fractional part.

Therefore, in the present exemplary embodiment, the vertical stripe correction data of a fractional part may be assigned to residue data after the residue data is corrected by the vertical stripe correction data of an integer, as illustrated in FIG. 9. The assignment of the vertical stripe correction data of the fractional part is determined based on the following viewpoint of (a).

(a) In comparison of an image and residue data after correction by the vertical stripe correction data of an integer, the vertical stripe of which the residue is equal to or less than about ±0.05 (the maximum amplitude is 0.1) is not remarkably noticeable.

From the viewpoint (a), the correction data of FIG. 9 are set forth as below. The correction data are set to eleven vertical stripe correction data: "0" when the residue data is "−0.05 to +0.05", "0.1" when the residue data is "0.05 to 0.15", "0.2" when the residue data is "0.15 to 0.25", "0.3" when the residue data is "0.25 to 0.35", "0.4" when the residue data is "0.35 to 0.45", "0.5" when the residue data is "0.45 to 0.5", "−0.1" when the residue data is "−0.05 to −0.15", "−0.2" when the residue data is "−0.15 to −0.25", "−0.3" when the residue data is "−0.25 to −0.35", "−0.4" when the residue data is "−0.35 to −0.45", and "−0.5" when the residue data is "−0.45 to −0.5". Meanwhile, how to assign the correction data of a fractional part for residue data is not limited to the example of FIG. 9.

Figure 10:
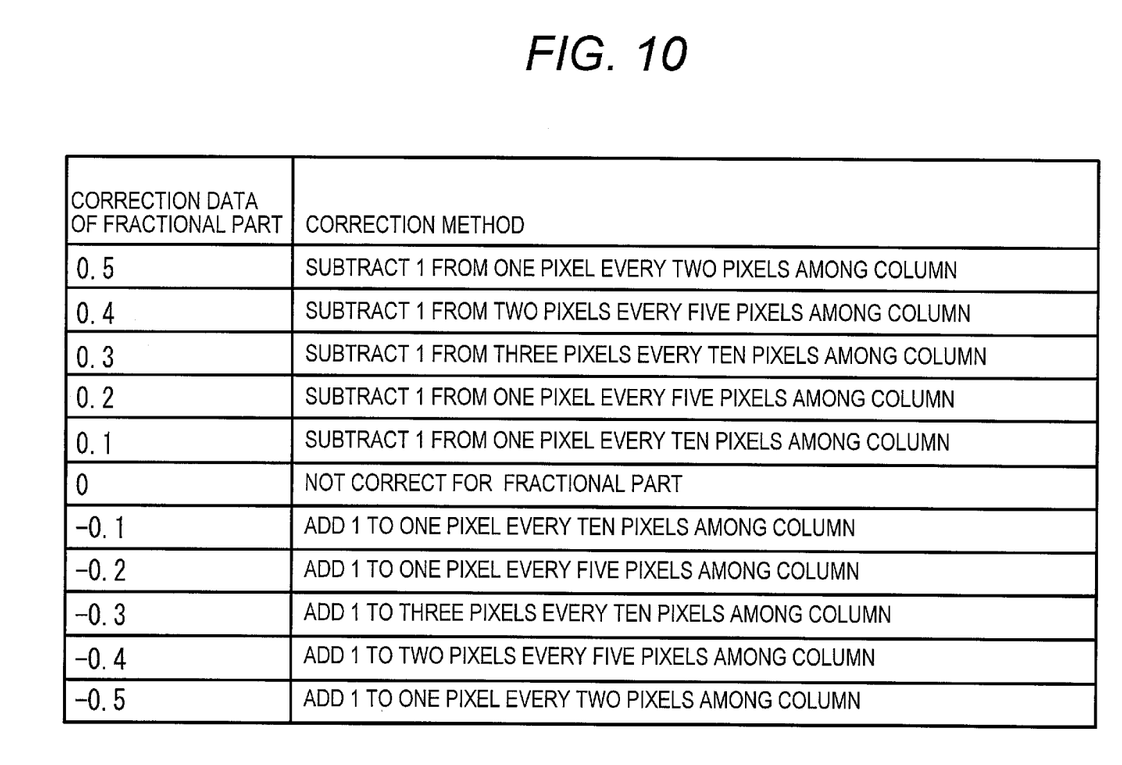
FIG. 10 is an explanatory diagram in a case where vertical stripe correction data of a fractional part is performed.

FIG. 10 is an explanatory diagram of a correction method by correction data of a fractional part. Like the correction using vertical stripe correction data of an integer part as described above, the correction using the vertical stripe correction data of a fractional part is also performed after a captured image signal is converted into digital data by an A/D converter. For this reason, the correction of a portion below the decimal point cannot be performed as it is. That is, the addition and subtraction of, for example, "0.3" cannot be performed for a pixel detection value after the correction of the integer part. Therefore, for example, when the correction of "0.3" for Gr color in the pixel column thereof is performed, the Gr pixels belonging to the pixel column are subtracted by "1" in a ratio of three pixels to ten pixels. Therefore, it becomes equivalent to the case where the ten pixels are subtracted by "0.3" on average. In this way, the correction of each of "±0.1", "±0.2", "±0.3", "±0.4" and "±0.5" is performed as illustrated in FIG. 10.

Such correction is performed for every frame of a moving image. Pixels to be subtracted by the value "1" whenever frames are changed may be selected randomly using, for example, random numbers rather than being fixed. As a result of simulation, it was found out that the results are the same regardless of whether the pixels to be subtracted are fixed or randomly selected. However, it is believed that the correction through the random selection is more stable. The user may be allowed to select either method.

Figure 11:
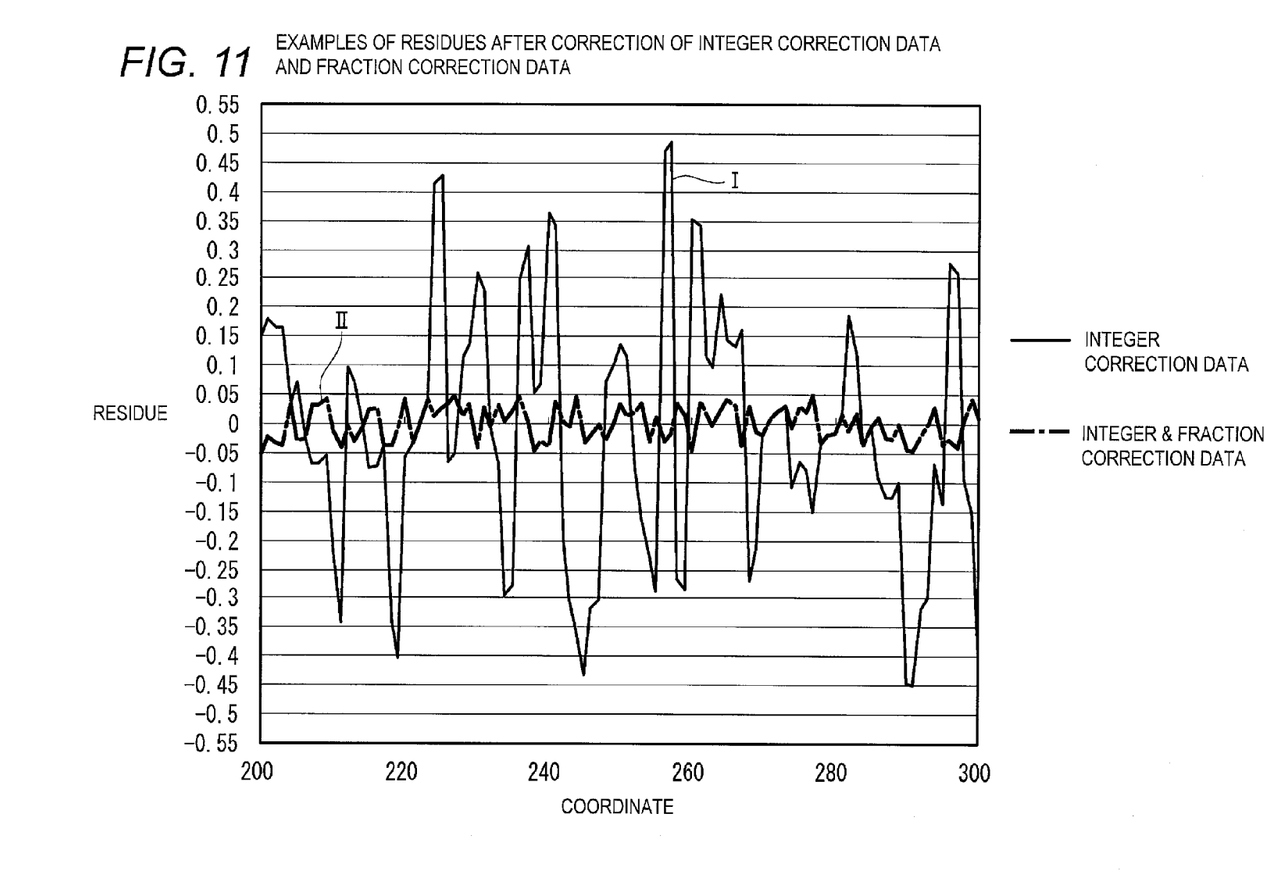
FIG. 11 is a characteristic diagram illustrating an effect when the vertical stripe correction in a fractional part is performed.

FIG. 11 is a graph illustrating an effect by performing the correction of a fractional part. The characteristic graph I represents the effect when only the vertical stripe correction of an integer part was performed (as in FIG. 8), and the residue data of a vertical stripe of "±0.5" remain. In contrast, the characteristic graph II is a graph when the vertical stripe correction of an integer part and the vertical stripe correction of a fractional part are both performed. The residue data of a vertical stripe become equal to or less than "±0.05" as illustrated in (a), so that the vertical stripe becomes noticeable.

As described above, in the present exemplary embodiment, when the vertical stripe noise is removed for each color of the color filters stacked in the image sensor, the vertical stripe correction data of an integer part is calculated for each of the colors by rounding off below the decimal point, and the vertical stripe correction data of a fractional part below the decimal point is calculated for each of the colors, so that the correction is performed using both data. Accordingly, even in an observation image under a special environment as an electronic endoscope, it is possible to make the visibility of the observation image good.

Meanwhile, even if the known noise reduction processing performed by comparing prior and post images is performed, there is no effect to the vertical stripe noise correction result of the present exemplary embodiment. For this reason, the noise reduction processing may be jointly used in order to reduce a noise component other than the vertical stripe noise.

As described above, although the vertical stripe correction of an image captured by a CMOS type imaging device accommodated in a front end part of an electronic endoscopic apparatus has been disclosed as an example, the present invention, of course, may be applied to the vertical stripe correction of an image captured by a CMOS type or CCD type imaging device mounted in, for example, a general digital camera and a video camera. Further, of course, the above-described exemplary embodiments may be applied to a transverse stripe noise.

As described above, the stripe noise correction method of a captured image according to the present exemplary embodiment includes: capturing, by a single-plate type image sensor for color image capturing that includes a plurality of pixels arranged in a square lattice array and a plurality of color filters with different colors which are respectively stacked on each of the pixels in a mosaic type, a plurality of images each of which has the same color with one of the colors of the color filters; calculating an average image for color images for the plurality of images and dividing the captured image signals of the average image into individual colors of the color filters; calculating, for each color, the stripe noise value for each pixel column or each pixel row by subtracting the average value of the captured image signals in the entire area where the pixels of the image sensor are arranged from the average value of the captured image signals of each pixel column or each pixel row of the image sensor; storing a value calculated by rounding off a portion below the decimal point of the stripe noise value into a memory as correction data of an integer part that corrects the stripe noise for each color; and storing the magnitude of a quantization error calculated by rounding off for each color and for each pixel column or each pixel row into the memory as correction data of a fractional part; and correcting the captured image signals of the image captured by the image sensor with the correction data of the integer part and the fractional part read from the memory.

In the stripe noise correction method of the captured image of the exemplary embodiment, when the magnitude of the quantization error which is rounded off below the decimal point is n/m where m and n are positive integers and m>n, the values of n pixels among m pixels of the pixel column or the pixel row are subtracted by "1" and the values of the remaining (m−n) pixels are not subtracted to perform the correction based on the correction data of the fractional part.

In the stripe noise correction method of the captured image of the exemplary embodiment, how to select the n pixels among the m pixels is randomly changed for each frame of the captured image which is a moving image.

A photographing apparatus of the exemplary embodiment includes: the image sensor set forth in any one as described above; the memory set forth in any one as described above; and an image processing unit that performs the stripe noise correction set forth in any one as described.

An electronic endoscopic apparatus of the exemplary embodiment includes: an endoscopic scope that is inserted into a body cavity; the image sensor that is accommodated in the front end part of the endoscopic scope and set forth in any one as described above; an illuminating unit that illuminates illuminating light from the front end part of the endoscopic scope; the memory set forth in any one as described above; and an image processing unit that performs the stripe noise correction set forth in any one as described above.

In the electronic endoscopic apparatus of the exemplary embodiment, the illuminating unit illuminates a special light of a narrow band as the illuminating light.

According to the exemplary embodiments as described above, the stripe noise may be removed with high precision, and thus a high quality of captured image may be obtained.

The stripe noise correction method according to the present invention may correct the stripe noise of the captured image in a high precision, and may be effectualy applied to, for example, a digital camera, a digital video camera, a handheld phone with a camera, an electronic equipment with a camera, and an electronic endoscope.

What is claimed is:

1. A stripe noise correction method of a captured image comprising:
   capturing, by a single-plate type image sensor for color image capturing that includes a plurality of pixels arranged in a square lattice array and a plurality of color filters with different colors which are respectively stacked on each of the pixels in a mosaic type, a plurality of images each of which has the same color with one of the colors of the color filters;
   calculating an average image for color images for the plurality of images and dividing the captured image signals of the average image into individual colors of the color filters;

calculating, for each color, the stripe noise value for each pixel column or each pixel row by subtracting the average value of the captured image signals in the entire area where the pixels of the image sensor are arranged from the average value of the captured image signals of each pixel column or each pixel row of the image sensor;

storing a value calculated by rounding off a portion below the decimal point of the stripe noise value into a memory as correction data of an integer part that corrects the stripe noise for each color; and storing the magnitude of a quantization error calculated by rounding off for each color and for each pixel column or each pixel row into the memory as correction data of a fractional part; and correcting the captured image signals of the image captured by the image sensor with the correction data of the integer part and the fractional part read from the memory.

2. The stripe noise correction method of claim 1, wherein, when the magnitude of the quantization error which is rounded off below the decimal point is n/m where m and n are positive integers and m>n, the values of n pixels among m pixels of the pixel column or the pixel row are subtracted by "1" and the values of the remaining (m−n) pixels are not subtracted to perform the correction based on the correction data of the fractional part.

3. The stripe correction method of claim 2, wherein, how to select the n pixels among the m pixels is randomly changed for each frame of the captured image which is a moving image.

4. A photographing apparatus comprising:

an image sensor which is a single-plate type image sensor for color image capturing that includes a plurality of pixels arranged in a square lattice array and a plurality of color filters with different colors which are respectively stacked on each of the pixels in a mosaic type and captures a plurality of images each of which has the same color with one of the colors of the color filters;

a memory; and an image processing unit configured to:

calculate an average image for color images for the plurality of images and divide the captured image signals of the average image into individual colors of the color filters;

calculate, for each color, the stripe noise value for each pixel column or each pixel row by subtracting the average value of the captured image signals in the entire area where the pixels of the image sensor are arranged from the average value of the captured image signals of each pixel column or each pixel row of the image sensor;

store a value calculated by rounding off a portion below the decimal point of the stripe noise value into the memory as correction data of an integer part that corrects the stripe noise for each color; and store the magnitude of a quantization error calculated by rounding off for each color and for each pixel column or each pixel row into the memory as correction data of a fractional part; and correct the captured image signals of the image captured by the image sensor with the correction data of the integer part and the fractional part read from the memory.

5. An electronic endoscopic apparatus comprising:

an endoscopic scope that is inserted into a body cavity;

an image sensor that is accommodated in the front end part of the endoscopic scope wherein the image sensor is a single-plate type image sensor for color image capturing that includes a plurality of pixels arranged in a square lattice array and a plurality of color filters with different colors which are respectively stacked on each of the pixels in a mosaic type and captures a plurality of images each of which has the same color with one of the colors of the color filters;

an illuminating unit that illuminates illuminating light from the front end part of the endoscopic scope;

a memory; and an image processing unit configured to:

calculate an average image for color images for the plurality of images and divide the captured image signals of the average image into individual colors of the color filters;

calculate, for each color, the stripe noise value for each pixel column or each pixel row by subtracting the average value of the captured image signals in the entire area where the pixels of the image sensor are arranged from the average value of the captured image signals of each pixel column or each pixel row of the image sensor;

store a value calculated by rounding off a portion below the decimal point of the stripe noise value into the memory as correction data of an integer part that corrects the stripe noise for each color; and store the magnitude of a quantization error calculated by rounding off for each color and for each pixel column or each pixel row into the memory as correction data of a fractional part; and correct the captured image signals of the image captured by the image sensor with the correction data of the integer part and the fractional part read from the memory.

6. The electronic endoscopic apparatus of claim 5, wherein, the illuminating unit illuminates a special light of a narrow band as the illuminating light.

* * * * *